US010866812B2

(12) United States Patent
Suryanarayana et al.

(10) Patent No.: US 10,866,812 B2
(45) Date of Patent: Dec. 15, 2020

(54) PRE-BOOT REMOTE CONNECTION FOR INTERFACE DATA TRANSFER

(71) Applicant: Dell Products L.P., Round Rock, TX (US)

(72) Inventors: Shekar Babu Suryanarayana, Bangalore (IN); Sumanth Vidyadhara, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 16/267,248

(22) Filed: Feb. 4, 2019

(65) Prior Publication Data

US 2020/0249960 A1 Aug. 6, 2020

(51) Int. Cl.
| | |
|---|---|
| G06F 15/177 | (2006.01) |
| G06F 1/24 | (2006.01) |
| G06F 9/4401 | (2018.01) |
| G06F 9/451 | (2018.01) |
| G06F 3/023 | (2006.01) |
| G06F 8/65 | (2018.01) |
| H04W 4/80 | (2018.01) |

(52) U.S. Cl.
CPC ............ G06F 9/4416 (2013.01); G06F 3/023 (2013.01); G06F 8/65 (2013.01); G06F 9/451 (2018.02); H04W 4/80 (2018.02)

(58) Field of Classification Search
CPC ........ G06F 9/4416; G06F 9/451; G06F 3/023; G06F 8/65; H04W 4/80
See application file for complete search history.

(56) References Cited

U.S. PATENT DOCUMENTS

| | | | | |
|---|---|---|---|---|
| 8,631,103 | B1* | 1/2014 | Guha | H04L 41/0253 709/223 |
| 9,110,679 | B1* | 8/2015 | Chan | G06F 9/4411 |
| 9,389,878 | B1* | 7/2016 | Chan | G06F 9/4411 |
| 2001/0052069 | A1* | 12/2001 | Sekiguchi | G06F 21/34 713/2 |
| 2016/0196147 | A1* | 7/2016 | Liu | G06F 9/4411 713/1 |

* cited by examiner

Primary Examiner — Nitin C Patel
(74) Attorney, Agent, or Firm — Norton Rose Fulbright US LLP

(57) ABSTRACT

An information handling system may connect to a remote client to display a user interface of the information handling system on a display of the remote client while the information handling system is in a pre-boot stage. The information handling system may transmit user interface data to the remote client for display of the user interface on the remote client. The information handling system may filter the user interface data to remove private information from the user interface data before transmitting the user interface data to the remote client.

21 Claims, 9 Drawing Sheets

PRE-BOOT REMOTE CONNECTION FOR INTERFACE DATA TRANSFER

FIELD OF THE DISCLOSURE

The instant disclosure relates to pre-boot operation of information handling systems. More specifically, portions of this disclosure relate to remote connection to an information handling system during a pre-boot stage.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may include a basic input/output system (BIOS) and/or unified extensible firmware interface (UEFI) to initialize hardware and boot an operating system (OS). The BIOS/UEFI may also facilitate communication between an operating system and hardware/firmware during normal operation of an information handling system.

During a pre-boot stage, when the BIOS/UEFI of an information handling system is initializing hardware, preparing to boot the OS, and/or booting the OS, the BIOS/UEFI may encounter errors or require configuration to complete initialization. For example, a corrupt BIOS may prevent booting of an operating system of an information handling system. If a user is not familiar with configuration and/or troubleshooting of the BIOS/UEFI, the user may be required to deliver their information handling system physically to a technician or to have a technician visit their location to configure the BIOS/UEFI and/or resolve any errors that are encountered during the pre-boot stage. Furthermore, allowing a technician to configure and/or troubleshoot the information handling system during the pre-boot stage may expose sensitive security settings and other private information to the technician.

Shortcomings mentioned here are only representative and are included simply to highlight that a need exists for improved information handling systems, particularly for remote connection while the information handling system is in a pre-boot stage. Embodiments described herein address certain shortcomings but not necessarily each and every one described here or known in the art. Furthermore, embodiments described herein may present other benefits than, and be used in other applications than, those of the shortcomings described above.

SUMMARY

An information handling system may connect to a remote client during a pre-boot stage to allow a user of the remote client to troubleshoot and/or configure the information handling system during the pre-boot stage. For example, an information handling system may transmit user interface data such as keyboard, video, and mouse (KVM) data to or from a remote client. User interface data may be transmitted as extensible markup language (XML) elements. In order to protect private user information, the information handling system may filter user interface data before transmission to a remote client device. An unfiltered user interface displayed on a display of the information handling system may display private information, but a filtered user interface may be displayed on a display of the remote client without private information. Filtering the user interface data may also prevent transmission of private user information over the internet. Thus, a user of a remote client, such as a technical support worker, may be able to connect remotely to an information handling system in a pre-boot stage and perform configuration or troubleshooting of the information handling system from a remote location without exposing private user information.

An information handling system may connect to a remote client, such as a remote information handling system, during a pre-boot stage to facilitate transfer of input and user interface data between the information handling systems. A first information handling system may enter a pre-boot stage, for example, when the first information handling system is powered on. The pre-boot stage may begin when the information handling system is powered on and may finish when the information handling system has completed booting of an Operating System. During the pre-boot stage a BIOS/UEFI of the information handling system may initialize hardware, prepare for booting of, and/or boot an operating system of the information handling system. After entering the pre-boot stage, the first information handling system may display a pre-boot user interface on a display of the first information handling system. The pre-boot user interface may be a graphical user interface and may display information for a user and/or to allow a user to configure the information handling system. The first information handling system may connect to a remote client through a Wi-Fi, cellular, or other wired or wireless network connection for transmission of user interface data, such as graphical user interface (GUI) data, to the remote client. For example, a user may select a remote client or intermediary information handling system for connection using a Bluetooth or Wi-Fi configuration wizard accessible in the pre-boot stage. Alternatively, the remote client may connect to the first information handling system and the first information handling system may require user approval before allowing the remote client to connect. After connecting to the remote client, the first information handling system may transmit user interface data to the remote client. The remote client may receive the user interface data and may display a user interface, such as a graphical user interface, on a display of the remote client based, at least in part, on the received user interface data.

The first information handling system may receive input data from the remote client. For example, a user of the remote client may generate input via an input device of the remote client such as a mouse or keyboard. The remote client may transmit input data to the first information handling system. The first information handling system may receive the input data and may update the user interface based, at least in part, on the received input data. The first information handling system may then display the updated user interface and may transmit updated user interface data to the remote client. The remote client may receive the updated user interface data and may display the updated user interface.

In some embodiments, a second information handling system may act as an intermediary between the first information handling system and the remote client. For example, the first information handling system may connect to a second information handling system through a Bluetooth, local area network, or other short-range communication connection. The second information handling system may be connected to the internet through a Wi-Fi, cellular, or other internet connection. The first information handling system may package user interface data in Bluetooth packets for transmission to the second information handling system. The second information handling system may receive user interface data in Bluetooth packets over the Bluetooth connection and may repackage the user interface data for transmission over a Wi-Fi, cellular, or other internet connection. The second information handling system may also receive input data from the remote client over the Wi-Fi, cellular, or other internet connection and may repackage the input data in Bluetooth packets for transmission to the first information handling system via the Bluetooth connection. The second information handling system may include an application for conversion of received Bluetooth user interface data to data for transmission over the internet and for initiating and configuring the connection between the first information handling system and the remote client.

User interface data for transmission to a remote client may be filtered before transmission to the remote client. The first information handling system may filter user interface data before transmitting it to the remote client to prevent exposure of private user information. For example, the first information handling system may filter the user interface data to remove elements that contain private information such as passwords, security configuration settings, and other private information. The first information handling system may filter the user interface data based, at least in part, on a credential of the remote client. For example, if the remote client has administrative privileges, the first information handling system may transmit unfiltered user interface data, while if the remote client does not have administrative privileges, the first information handling system may filter the user interface data to remove private information. The first information handling system may then display an unfiltered user interface on a display of the first information handling system and may transmit the filtered user interface data to the remote client for display of a filtered user interface on a display of the remote client.

The user interface data may include keyboard, video, and mouse (KVM) data. For example, the user interface data may be transmitted as one or more extensible markup language (XML) elements such as elements containing KVM data. The user interface data may be filtered by the first information handling system to remove XML elements that include private information. The XML elements may be transmitted to the remote client and may be used to reconstruct the user interface, absent any XML elements that were filtered before transmission. The remote client may, for example, include an application for reconstructing a user interface from received XML elements. Transmission of user interface data in XML elements as opposed to, for example, streaming a pixel map and/or video of a user interface, may require substantially less bandwidth, enhancing responsiveness and improving a user experience. A reduction in required bandwidth may be particularly useful when using an intermediary information handling system connected to the first information handling system via a Bluetooth connection, given the limited data transmission capabilities of Bluetooth.

First and second information handling systems and a remote client may include processors and displays for performing the steps described herein. Information handling systems may also include displays for displaying user interfaces and input devices such as keyboards, mice, touch screens, and other input devices for receiving input from a user, whether in a pre-boot stage or in normal operation. Information handling systems may also include Bluetooth, Wi-Fi and other wireless and wired connection modules for connecting information handling systems.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
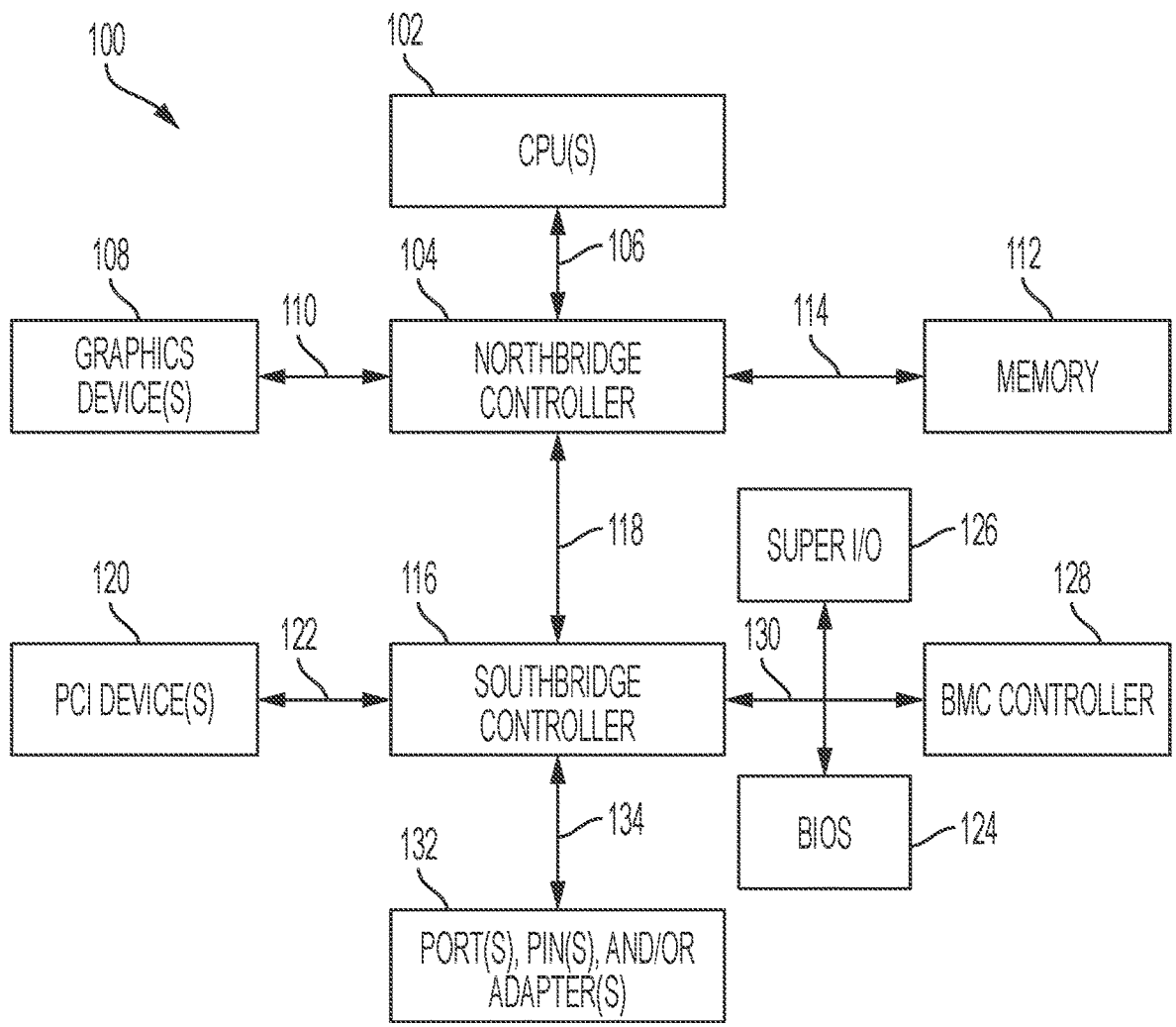
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHS s attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130.

BIOS 124 may include non-volatile memory having program instructions stored thereon. The instructions stored on the BIOS may be usable CPU(s) 102 to initialize and test other hardware components and/or to load an Operating System (OS) onto IHS 100, for example during a pre-boot stage. As such, BIOS 124 may include a firmware interface that allows CPU(s) 102 to load and execute certain firmware, as described in more detail below. In some cases, such firmware may include program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the BIOS' firmware interface to initialize and test components of IHS 100.

Super I/O Controller 126 combines interfaces for a variety of lower bandwidth or low data rate devices. Those devices may include, for example, floppy disks, parallel ports, keyboard and mouse, temperature sensor and fan speed monitoring, etc. For example, the super I/O controller 126 may be coupled to the one or more upstream sensors 106 and to the one or more downstream sensors 108.

In some embodiments, IHS 100 may be configured to access different types of computer-accessible media separate from memory 112. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 104 and/or southbridge controller 116.

In some embodiments, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be mounted on a motherboard and protected by a chassis or the like.

Figure 2:
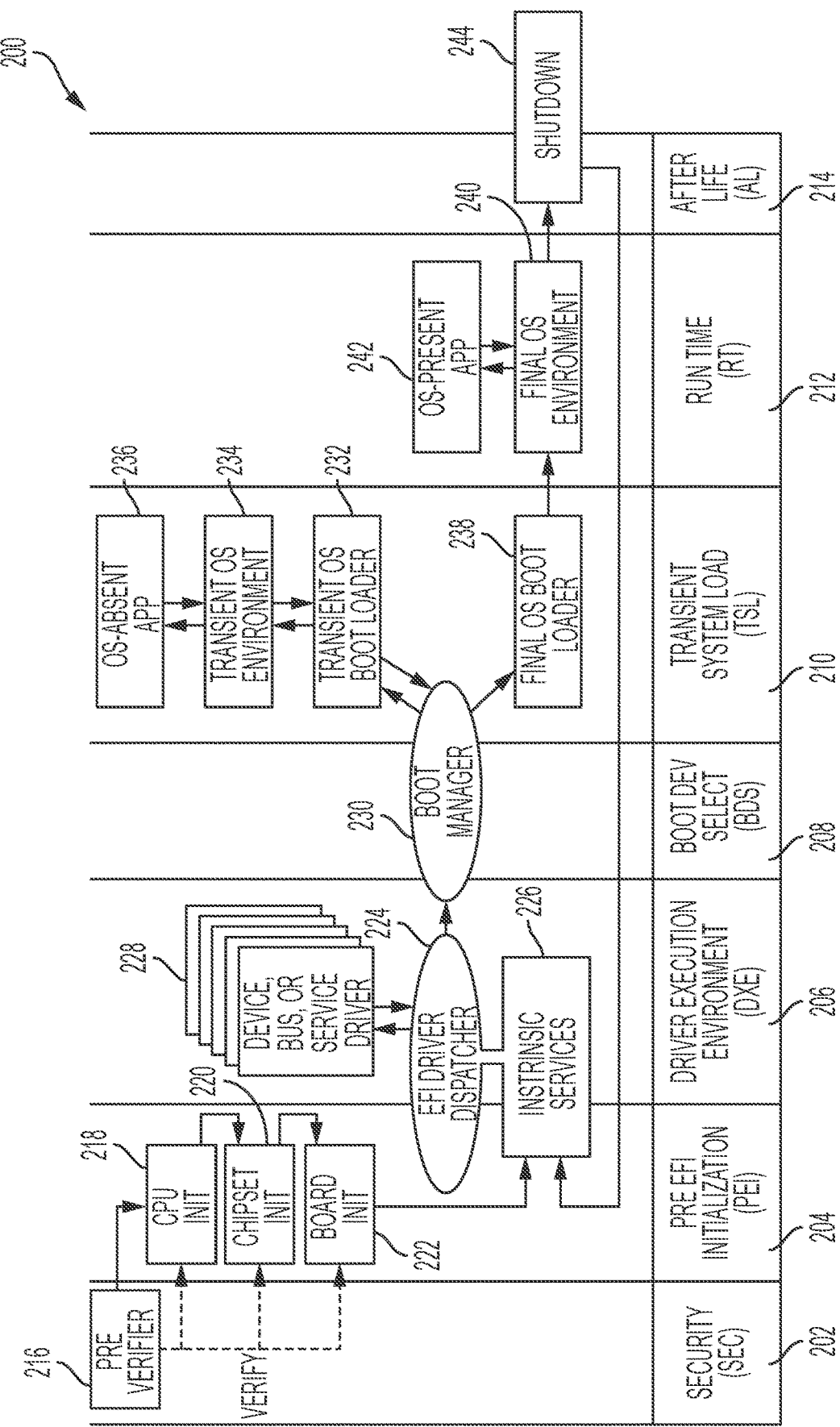
FIG. 2 is a process diagram of example information handling system operation according to some embodiments of the disclosure.

When an information handling system is powered up or restarted, the information handling system may enter a pre-boot stage where a BIOS/UEFI may initialize and configure hardware and firmware, prepare the information handling system for booting of the operating system, and boot the operating system. The pre-boot stage may begin when the information handling system is powered on and may finish when the information handling system has completed booting of an Operating System. An example process diagram 200 of operation of an information handling system, including a pre-boot stage, is shown in FIG. 2. After an IHS is powered on, the IHS may enter a security phase 202 of the pre-boot stage where the BIOS/UEFI may perform a pre-verify operation 216 to examine the security certificate and verify that the device is ready for secure operation. After the security phase 202, the IHS may enter a pre-extensible firmware interface initialization phase 204, wherein the IHS may initialize 218 a CPU, initialize 220 a chipset, and initialize 222 a motherboard. After initializing the CPU, chipset and motherboard, the IHS may initialize intrinsic services 226 and may enter a driver execution environment 206. The IHS may initiate an extensible firmware interface driver dispatcher 224 which may execute device, bus, and/or services drivers 228. The EFI driver dispatcher 224 may then initialize a boot manger 230 and the IHS may enter a boot device select (BDS) phase 208 to select a boot device. In some embodiments, a pre-boot graphical user interface may be initialized when the information handling system exits a driver execution environment stage 206 and enters a boot device select stage 208. The information handling system may then enter a transient system load (TSL) phase where the boot manger may initialize a transient OS boot loader 232, a transient OS environment 234, and an OS-absent application 236. The boot manger 230 may initialize a final OS boot loader 238 to initialize final operation of the operating system. The information handling system may then enter a run time phase 212 where a final OS environment 240 is presented, and an OS-present application 242 is executed. When the information handling system enters the run time phase 212, the pre-boot stage may end. After power down, the IHS enters an after life stage 214 and may perform a shutdown operation 244. In some embodiments, if an information handing system is simply restarted, it may bypass a security stage 202 and proceed directly to initialization of intrinsic services 226.

Figure 3:
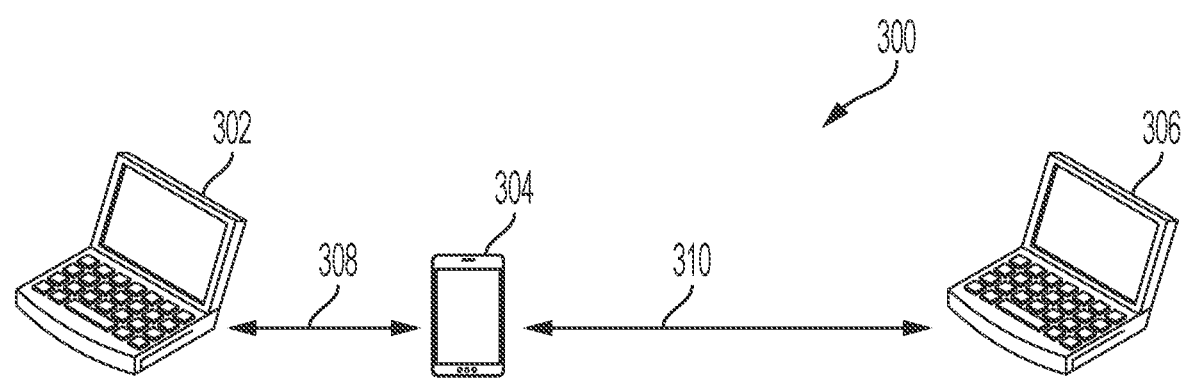
FIG. 3 is a diagram of an example system for connecting an information handling system to a remote client according to some embodiments of the disclosure.

Before an information handling system has finished booting, an information handling system may encounter errors or may require configuration. Allowing for remote access of an information handling system, while it is in a pre-boot stage, can allow remote troubleshooting of errors and/or configuration of the information handling system before an operating system has finished booting. An example system 300 for connecting a first information handling system 302 to a remote client 306 while the first information handling system 302 is in a pre-boot stage is shown in FIG. 3. The first information handling system 302 may be a laptop, tablet, smart phone, server, or other information handling system. For example, the first information handling system may be a laptop computer operated by a consumer. A user of the first information handling system 302 may power the device on, entering a pre-boot stage. The user of the first information handling system 302 may enter information for connecting to the remote client 306 such as by selecting an icon to request support or entering a support code or address.

The remote client 306 may be an information handling system at a remote location, such as a technical support or service center. For example, the remote client may be a laptop computer, a desktop, a server, a mobile device such as a cell phone or tablet, or other information handling system. The remote client 306 need not be in a pre-boot mode, but may have software installed to receive user interface data from the first information handling system 302, to display the user interface on a display of the remote client 306, and to transmit input data to the first information handling system 302. For example, a technical support agent operating the remote client 306 may view the pre-boot user interface displayed on a display of the first information handling system 302 and a display of the remote client 306 and may configure or troubleshoot the first information handling system 302 by generating input on the remote client 306, for example by using a keyboard or mouse to manipulate the user interface. The first information handling system 302 may transmit user interface data, such as keyboard, video, and mouse (KVM) data to the second information handling system. The user interface data may include or consist entirely of extensible markup language (XML) elements, and the remote client 306 may include software to receive the XML elements and reconstruct the user interface based on the received XML elements. Thus, a graphical user interface displayed on a first information handling system may be mirrored on a remote client.

In some embodiments, a second information handling system 304, such as a smart phone, may act as an intermediary to facilitate the connection between the first information handling system 302 and the remote client 306. For example, the first information handling system 302 may connect to the second information handling system 304 via a short-range connection such as a Bluetooth, Wi-Fi, or other wired or wireless connection. The second information handling system 304 may connect to the remote client 306 via an internet connection 310 such as a Wi-Fi, cellular, or other wired or wireless internet connection. The second information handling system 304 may include an application for facilitating a connection between the first information handling system 302 and the remote client 306. In some embodiments, the first information handling system 302 may connect to the remote client 306 without the use of an intermediary information handling system. For example, the first information handling system 302 may connect to the remote client 306 via a Wi-Fi, cellular, or other internet connection.

Figure 4:
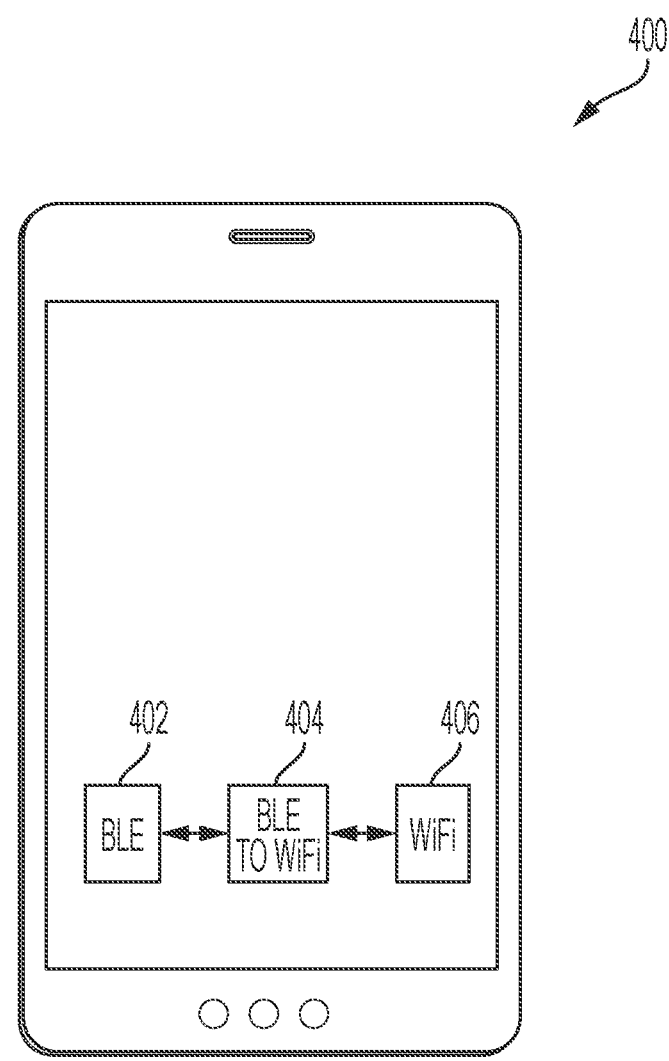
FIG. 4 is an illustration of an example intermediary information handling system for connecting a first information handling system to a remote client, according to some embodiments of the disclosure.

A second information handling system may receive user interface data from a first information handling system and forward the information on to a remote client. An example second information handling system 400 for acting as an intermediary between a first information handling system and a remote client is shown in FIG. 4. The second information handling system may include a Bluetooth module 402 for connecting to the first information handling system via a Bluetooth connection. For example, a first information handling system may connect to the second information handling system via a Bluetooth connection and may package user interface data, such as XML elements, in Bluetooth packets. The second information handling system may include a conversion module 404 to convert Bluetooth packets to a format for transmission over a Wi-Fi, cellular, or other internet connection. The conversion module 404 may also convert packets received over an internet connection to Bluetooth packets for transmission to the first information handling system. The information handling system 400 may also include a Wi-Fi module 406 for connecting to a remote client via a wireless connection to transmit and receive user interface and input data. Alternatively or additionally, the information handling system 400 may include a module for connection to a remote client over a cellular, wired, or other internet connection. Thus, the second information handling system 400 may receive user interface data from a first information handling system in a first format, convert the data to a second format for transmission to a remote client, and may transmit the converted user interface data to the remote client. The second information handling system 400 may also receive input data from the remote client in the second format, convert the data to the first format and transmit the converted input data to the first information handling system.

Figure 5A:
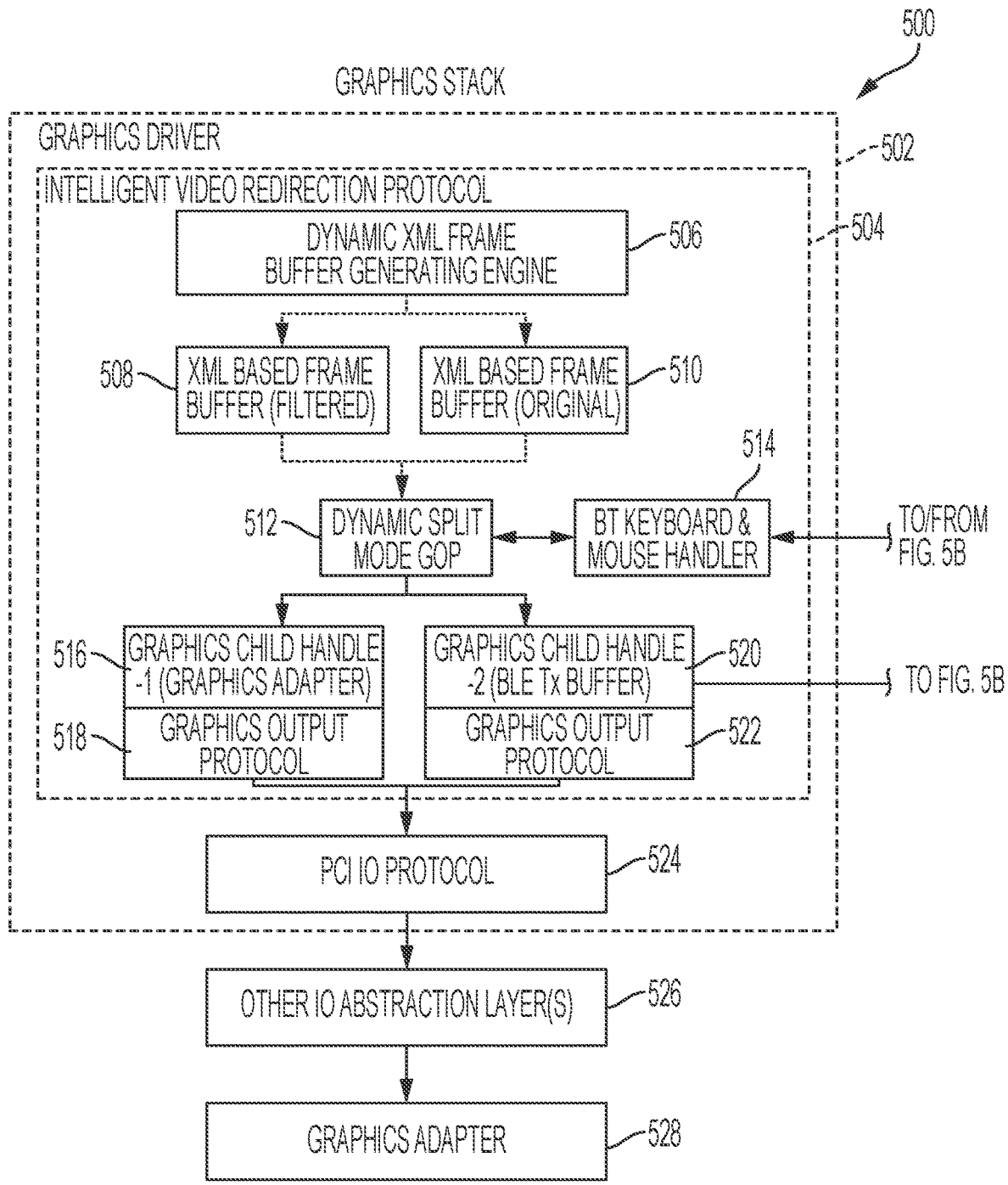
FIG. 5A is a block diagram of an example pre-boot graphics stack according to some embodiments of the disclosure.

An information handling system may include a graphics stack, such as a unified extensible firmware interface (UEFI) pre-boot graphics stack for generating a pre-boot graphical user interface. An example graphics stack 500 is shown in FIG. 5A. The graphics stack 500 may generate a user interface while the information handling system is in a pre-boot stage and, in some embodiments, may generate filtered user interface data for transmission to a remote client. The graphics stack 500 may include a graphics driver 502, such as a UEFI graphics driver, for generating a graphical user interface for the information handling system before an operating system of the information handling system has booted. The graphics driver 502 may include an intelligent video redirection protocol 504 for generating filtered and unfiltered graphical user interface data outputs. The graphics driver 502 may include a dynamic XML frame buffer generating engine 506 for accessing and/or generating XML elements, such as XML frames, for the graphical user interface. For example, the dynamic XML frame buffer generating engine 506 may use one or more GUI libraries, such as Magneto, PEG, AGAR, or other GUI libraries, to assemble XML or HTML elements of a GUI. XML or HTML elements of a GUI may include widgets, icons, fonts, images, and other elements and the frame buffer generating engine 506 may embed the elements into a frame buffer. The dynamic XML frame buffer generating engine 506 may also filter the frames for private information and may output a filtered set of XML frames to a filtered XML based frame buffer 508 and an unfiltered set of XML frames to an unfiltered XML based frame buffer 510. In some embodiments, such as when a connected remote client has administrative privileges, the dynamic XML frame buffer generating engine 506 may not generate a filtered set of XML frames and may simply pass an identical set of XML frames to the Bluetooth stack shown in FIG. 5B for transmission to the remote client and to the graphics adapter 528 for generation and display of the unfiltered user interface on the information handling system.

The filtered and unfiltered sets of XML frames are then passed through a dynamic split mode graphics output protocol 512 that integrates keyboard mouse and other input data in the graphical user interface. For example, XML frames related to display of keyboard or mouse data may be added to the filtered and unfiltered sets of XML frames by the dynamic split mode graphics output protocol 512. Accordingly, the dynamic split mode graphics output protocol 512 may communicate with a Bluetooth keyboard and mouse handler 514 or another keyboard and mouse handler. For example, both keyboard and mouse data received via Bluetooth and local keyboard and mouse data may be added to the sets of graphical user interface XML frames. The Bluetooth keyboard and mouse handler 514 may communicate with a Bluetooth stack, as discussed with respect to FIG. 5B.

The dynamic split-mode graphics output protocol 512 may pass the unfiltered XML graphical user interface frames with keyboard and mouse data to a first graphics child handle 516, which may handle a graphics output buffer for rendering onto graphics adapter 528. The unfiltered graphical user interface frames may be passed to a graphics output protocol 518, which may put the frames through a bit lock transfer (BLT) process which may render the frames as a pixel matrix on a screen. A peripheral component interconnect (PCI) input/output (IO) protocol 524 may transfer the block data to other IO abstraction layers 526 for further processing. Graphics adapter 528 may generate and display a graphical user interface on a display of the information handling system. For example, graphics adapter 528 may be a hardware graphics controller.

The dynamic split-mode graphics output protocol 512 may pass the filtered XML graphical user interface frames with keyboard and mouse data to a second graphics child handle 520, which may be a Bluetooth transmission buffer. The second graphics child handle 520 may output the XML graphical user interface frames with keyboard and mouse data to the Bluetooth stack for transmission to a remote client, as discussed with respect to FIG. 5B. In some embodiments, the filtered XML graphical user interface frames with keyboard and mouse data may be passed to the PCI IO protocol 524 for transmission to IO abstraction layers 526 for further processing.

Figure 5B:
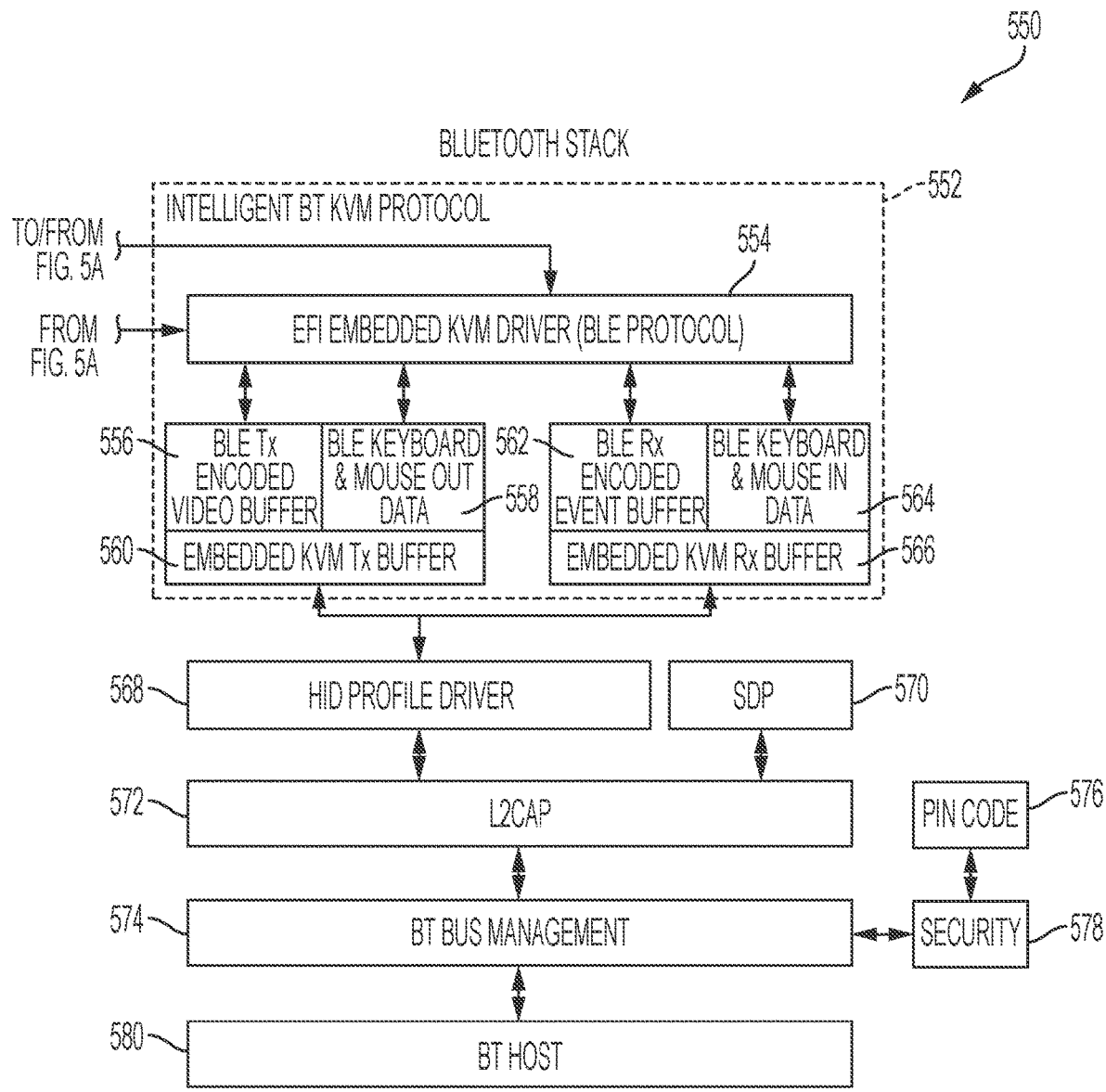
FIG. 5B is a block diagram of an example pre-boot Bluetooth stack according to some embodiments of the disclosure.

An information handling system may process user interface data, such as filtered or unfiltered XML KVM frames, for transmission to a second information handling system via a wireless connection. An example Bluetooth stack 550, such as extensible firmware interface Bluetooth stack, for packaging, transmitting, and receiving information, while an information handling system is in a pre-boot stage is shown in FIG. 5B. The Bluetooth stack 550 may include an intelligent Bluetooth keyboard, video, and mouse (KVM) protocol 552 to package KVM data, such as XML frames, in Bluetooth packets for transmission over a Bluetooth connection and to unpack Bluetooth packets received over the Bluetooth connection. An extensible firmware interface embedded KVM driver 554, which may operate according to a Bluetooth low energy protocol, may be configured to exchange user interface data, such as KVM data, between a graphics stack, such as the graphics stack 500 shown in FIG. 5A, and Bluetooth receipt and transmission buffers.

The extensible firmware interface embedded KVM driver 554 may receive user interface data, such as KVM data in the form of one or more XML graphical user interface frames with keyboard and mouse data, from a graphics stack of the information handling system. The embedded KVM driver 554 may package the received user interface data in Bluetooth packets for transmission over a Bluetooth connection and may pass graphical user interface packets to a Bluetooth low energy (BLE) transmission encoded video buffer 556 and keyboard and mouse packets on to a BLE keyboard and mouse data buffer 558. The graphical user interface packets and the keyboard and mouse packets may be combined in an embedded KVM transmission buffer 560 for transmission to an intermediary information handling system.

The extensible firmware interface embedded KVM driver 554 may also receive input data, such as keyboard, mouse, and other input data, received over a Bluetooth connection from a remote client via an intermediary information handling system. The extensible firmware interface embedded KVM driver 554 may extract the input data from the received Bluetooth packets and may pass the input data to an extensible firmware interface graphics stack, such as the graphics stack illustrated in FIG. 5A, so that a graphical user interface may be adjusted based on the input. Received packets containing input data may be stored in an embedded KVM receipt buffer 566 before being separated into a Bluetooth low energy encoded event buffer 562, which may store the events caused by the input data, and a keyboard and mouse input data buffer 564, which may store the received keyboard and mouse input data.

In some embodiments a human interface device (HID) profile driver 568 may perform higher level processing of KVM data. A session description protocol 570 may govern the transmission and receipt of Bluetooth data between a first information handling system and an intermediary information handling system. A logical link control and adaptation protocol (L2CAP) 572 may also govern transmission and receipt of Bluetooth packets between the first information handling system and an intermediary information handling system. A Bluetooth bus management unit 574 may also govern the Bluetooth connection and may function in accordance with a security unit 578. For example, a personal identification number (PIN) 576 code may be used to provide enhanced security. A Bluetooth host 580 may facilitate a connection between a first information handling system and an intermediary information handling system.

Figure 6:
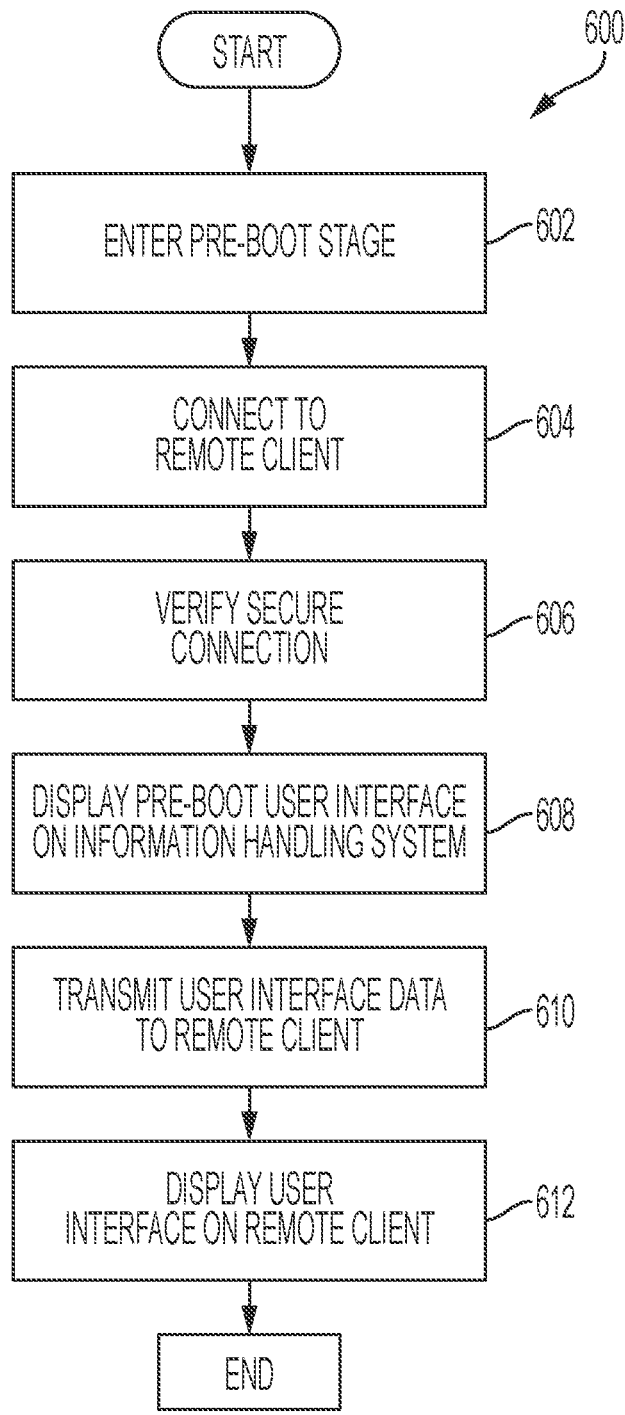
FIG. 6 is a flow chart of an example method for displaying a user interface of an information handling system on a remote client during a pre-boot stage according to some embodiments of the disclosure.

A first information handling system may connect to a remote client while in a pre-boot stage to display a user interface of the first information handling system on the remote client. An example method 600 for displaying a pre-boot user interface on a remote client is shown in FIG. 6. The method 600 may begin at step 602 with an information handling system entering a pre-boot stage. For example, a user may power up or restart an information handling system such as a laptop computer.

At step 604 the information handling system may connect to a remote client. For example, when the information handling system enters the pre-boot stage, a configuration manager/wizard may activate or may be activated by a user to allow setup of a connection between the information handling system and a remote client. The configuration manager/wizard may allow a user to select a means of connection to a remote client, such as establishing a Bluetooth connection with an intermediary information handling system or connecting to the internet via Wi-Fi, a cellular connection, or another connection. The configuration manger/wizard may allow a user to enter information specifying a remote client for connection. In some embodiments, an information handling system may connect to an intermediary information handling system via a Bluetooth connection. The intermediary information handling system may connect to a remote client, via the internet, to forward user interface information from the first information handling system to the remote client. After connecting to a remote client, the information handling system may, at step 606, verify that a connection to the remote client is secure. For example, the information handling system may engage in a security negotiation to perform a secure handshake with the remote client. In some embodiments, if the information handling system is unable to verify that a connection is secure, it may break the connection and avoid transmitting graphical user interface data to the remote client.

At step 608 the information handling system may generate and display a pre-boot user interface on a display of the information handling system. For example, the information handling system may generate a user interface based on KVM data, such as one or more XML frames containing keyboard, video, and mouse data.

At step 610, the first information handling system may transmit user interface data to the remote client over the internet. For example, in some embodiments the first information handling system may stream video of the user interface to the remote client. In other embodiments, the user interface may transmit XML elements, such as XML frames containing graphical user interface elements. Transmitted XML elements may include XML tags. If XML elements are transmitted, the remote client may include software for reconstructing a user interface based on the XML elements.

At step 612, the user interface may be displayed on a display of the remote client. Steps 604, 606, 608, 610, and 612 may all occur while the information handling system is in a pre-boot stage to allow a user operating the remote client to assist with configuration and or troubleshooting on the information handling system before the OS has been booted.

Figure 7:
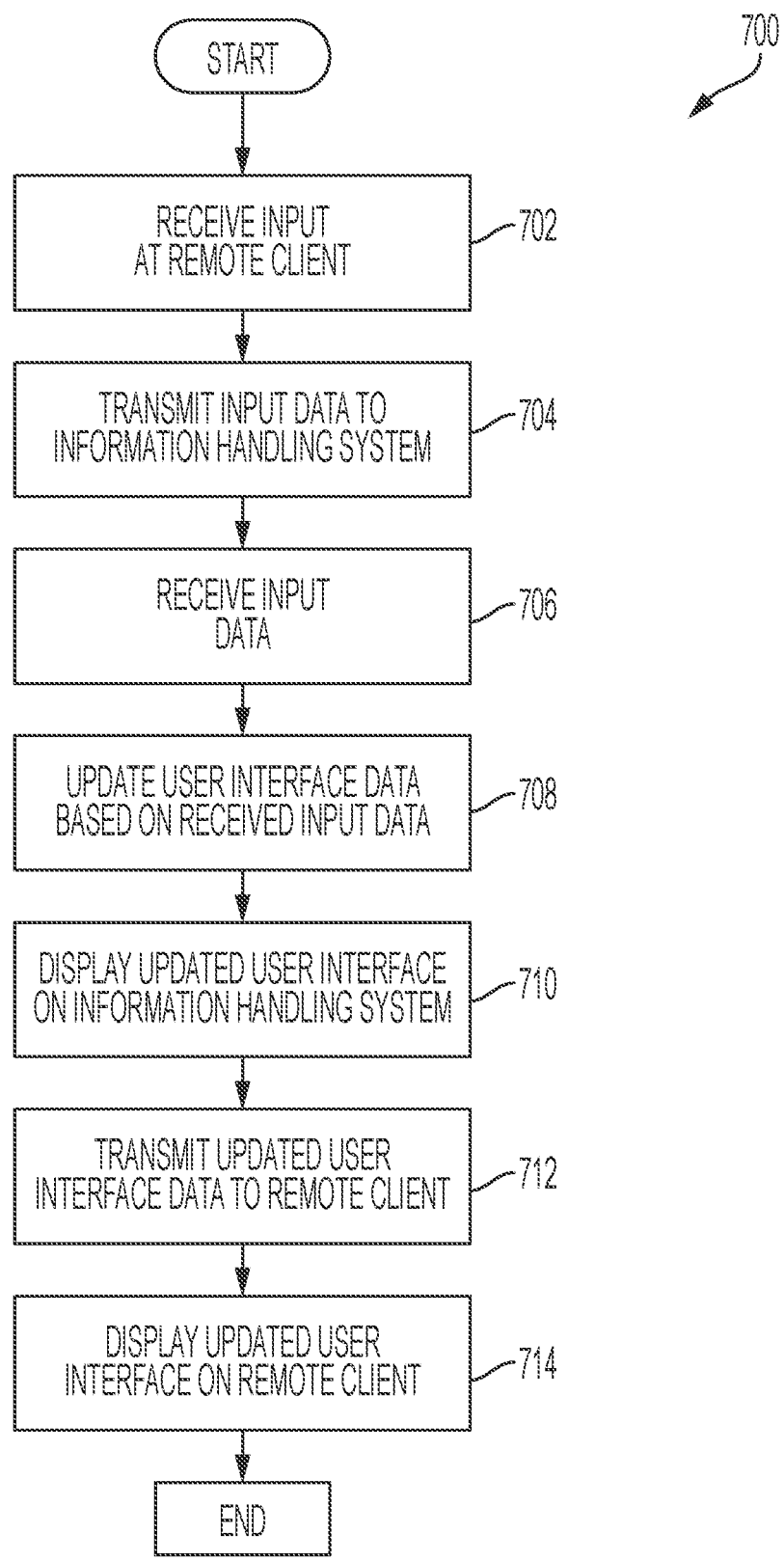
FIG. 7 is a flow chart of an example method for updating a user interface based on input data received from a remote client according to some embodiments of the disclosure.

In order to allow a user of the remote client to interact with the information handling system, the remote client may transmit input data to the information handling system, and the information handing system may adjust the user interface based on the received input data. An example method 700 for adjusting a user interface based on received input data is shown in FIG. 7. The method may begin at step 702 with receipt of an input at a remote client. For example, method 700 may commence after method 600 has finished and a user interface is displayed on a display of a remote client. A user of the remote client may use a keyboard, mouse, touch screen, or other input device to interact with the user interface, generating an input. The input data may include keyboard, mouse, touch screen, event, and other input data.

At step 704 the remote client may transmit input data to the information handling system. In some embodiments, the input data may be transmitted in the form of one or more XML elements. The remote client may transmit data via the internet to the information handling system or to an intermediary information handling system.

At step 706 the information handling system may receive the input data and, at step 708, the information handling system may update user interface data based, at least in part, on the received input data. For example, the information handling system may update keyboard and/or mouse data included in one or more KVM XML elements based on the received input data.

At step 710 the updated user interface may then be generated and displayed on a display of the information handling system based, at least in part, on the updated user interface data. At step 712, the updated user interface information may be transmitted to the remote client. At step 714, the remote client may display the updated user interface. In some embodiments, the remote client may receive the user interface data in the form of one or more KVM XML elements and may regenerate the user interface based on the received user interface data. The steps of method 700 may also all occur while a first information handling system is in a pre-boot stage.

Figure 8:
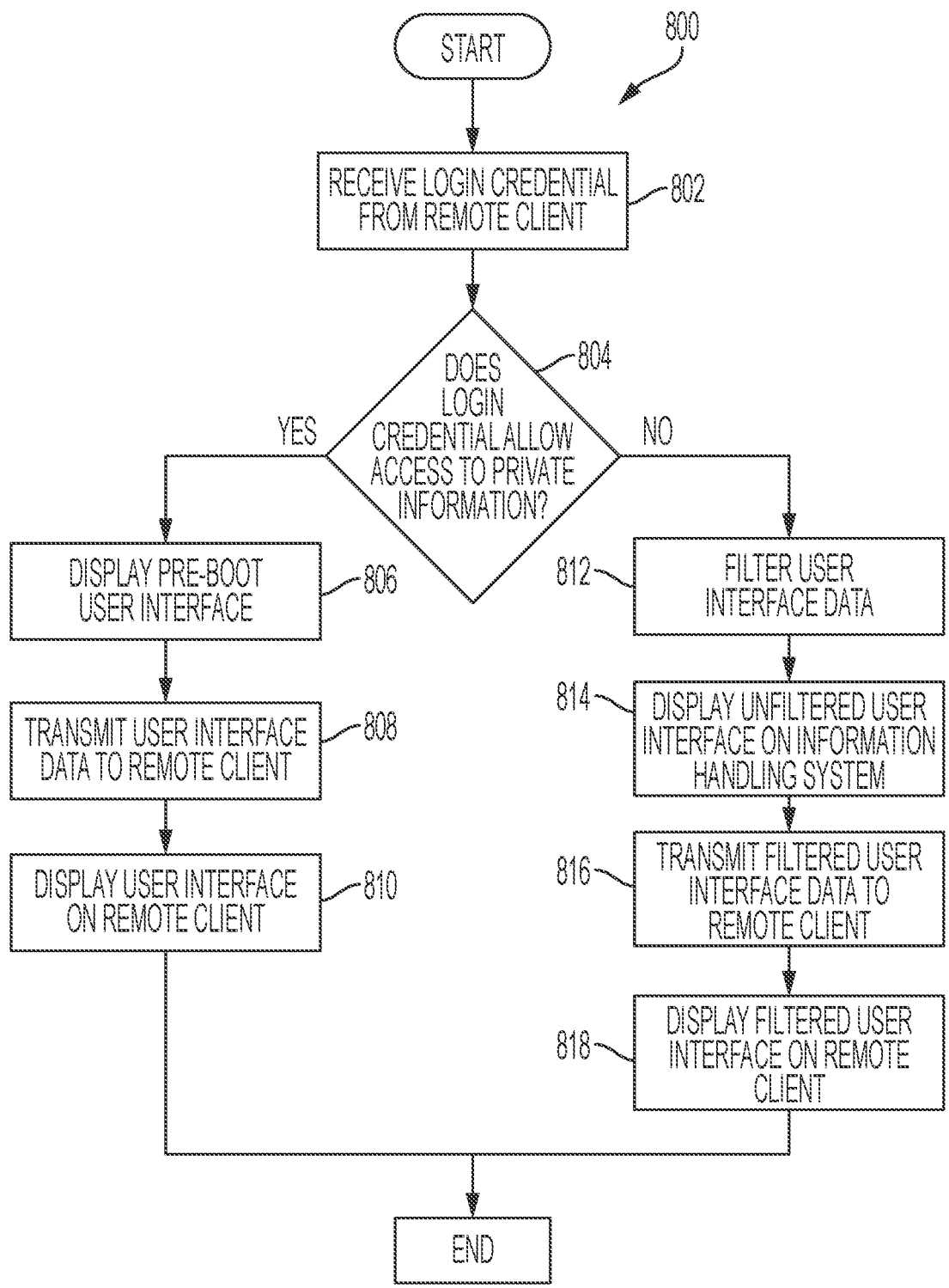
FIG. 8 is a flow chart of an example method for filtering user interface data for display of a filtered user interface on a remote client according to some embodiments of the disclosure.

The information handling system may filter user interface data before it is transmitted to the remote client to prevent private information from being exposed to a user of the remote client. An example method 800 of filtering user interface data is shown in FIG. 8. At step 802, a first information handling system may receive a login credential from a remote client. Such a step may occur, for example, after the first information handling system has performed steps of entering a pre-boot stage, connecting to a remote client, and verifying that the connection to the remote client is secure, as described with respect to FIG. 6. The login credential may, for example, include a password, a pin number, a user name, or other credential.

At step 804, the first information handling system may determine whether the login credential allows the remote client access to private information. For example, the first information handling system may determine whether the login credential grants the remote client administrative privileges. If the login credential grants the remote client access to private information, there is no need to filter. The method 800 may proceed to step 806 and a pre-boot interface may be displayed on a display of the first information handling system. At step 808, the first information handling system may transmit user interface data to the remote client. At step 810, the remote client may display the user interface on a display of the remote client. For example, the remote client may generate a user interface for display based on received user interface data.

If the login credential does not grant the remote client access to private information at step 804, the information handling system may filter user interface data before transmitting it to the remote client. At step 812 the first information handling system may filter user interface data to remove private information. For example, the first information handling system may filter XML elements containing user interface data to remove XML elements that contain private information. The first information handling system may scan XML tags of XML elements for XML tags indicating user interface elements that may contain private information and may filter XML elements with such tags. The first information handling system may create a set of XML elements containing all user interface data for generation of a user interface for the information handling system and a set of XML elements having elements with private information removed for transmission to a remote client. Privacy and filtering settings may be adjusted by a user or may be set based on a pre-boot application. At step 814 the first information handling system may display an unfiltered user interface on a display of the first information handing system. For example, the first information handling system may generate an unfiltered user interface based on the unfiltered user interface XML elements. At step 816 the first information handling system may transmit the filtered user interface data to the remote client. For example, the first information handling system may transmit the filtered user interface data to the remote client via an internet connection.

In some embodiments, the first information handling system may transmit the filtered user interface data to a second, intermediary, information handling system via a Bluetooth connection. The second, intermediary information handling system may then repackage the filtered user interface data for transmission over the internet and may transmit the filtered user interface data to the remote client.

At step 818 the remote client may display the filtered user interface on a display of the remote client. For example, the remote client may generate a filtered graphical user interface, based, at least in part, on filtered user interface data, such as a filtered set of XML elements. The displayed filtered graphical user interface, generated based on the filtered set of XML elements, may be similar in appearance to the unfiltered user interface displayed on the first information handling system, but with private information removed from the user interface. The steps of method 800 may be performed while the first information handling system is in a pre-boot mode.

With respect to FIG. 6, a first information handling system may perform step 602, entering a preboot stage, step 604, connecting to a remote client directly or through an intermediary second information handling system, step 606, verifying that a connection to a remote client is secure, step 608, displaying a pre-boot graphical user interface on a display of the first information handling system, and step 610, transmitting user interface data to a remote client. With respect to FIG. 7, a first information handling system may perform step 706, receiving input data from a remote client, either directly or through an intermediary second information handling system, step 708, updating user interface data based on the received input data, step 710, displaying an updated user interface on a display of the first information handling system, and step 712, transmitting updated user interface data to the remote client. With respect to FIG. 8, a first information handling system may perform step 802, receiving a login credential from a remote client, and step 804, determining whether the login credential allows access to private information. If the login credential is determined to allow access to private information, the first information handling system may perform step 806, displaying a pre-boot user interface, and step 808, transmitting unfiltered user interface data to a remote client. If the login credential is determined not to allow access to private information, the first information handling system may perform step 812, filtering user interface data, step 814, displaying an unfiltered user interface on a display of the first information handling system, and step 816, transmitting filtered user interface data to a remote client.

With respect to FIG. 6, a remote client may perform step 612 after receiving user interface data from a first information handling system, displaying a user interface based on the received user interface data on a display of the remote client. With respect to FIG. 7, a remote client may perform step 702, receiving an input, step 704, transmitting input data to a first information handling system, and may, after receiving updated user interface data from a first information handling system, perform step 714, displaying an updated user interface on a display of the remote client based on the received updated user interface. With respect to FIG. 8, the remote client may transmit a login credential to the first information handling system prior to step 802. If the login credential entitles the remote client to access private information, the remote client may perform step 810 after receiving user interface data from the first information handling system, displaying a user interface on a display of the remote client based on the received user interface data. If the login credential does not entitle the remote client to access private information, the remote client may perform step 818, after receiving filtered user interface data, displaying a filtered user interface on a display of the remote client based on the received filtered user interface data.

An intermediary second information handling system may act as an intermediary between a first information handling system and a remote client. For example, with respect to FIG. 6, an intermediary second information handling system may receive the user interface data transmitted by the user interface data at step 610, may convert a format of the data, as described herein, and may forward the data to the remote client, as described herein. With respect to FIG. 7, an intermediary second information handling system may receive input data transmitted at step 704 and may convert a format of the input data, as described herein, before forwarding the data to the first information handling system. The intermediary second information handling system may also receive updated user interface data transmitted at step 712, and may convert a format of the updated user interface data before forwarding the updated user interface data to the remote client. With respect to FIG. 8, an intermediary second information handling system may receive a login credential from a remote client and may update a format of the login credential before forwarding the login credential to be received by the first information handling system at step 802. An intermediary second information handling system may also receive user interface data transmitted at step 808 or filtered user interface data transmitted at step 816 and may update a format of the unfiltered or filtered user interface data before forwarding the user interface data to a remote client.

Figure 9A:
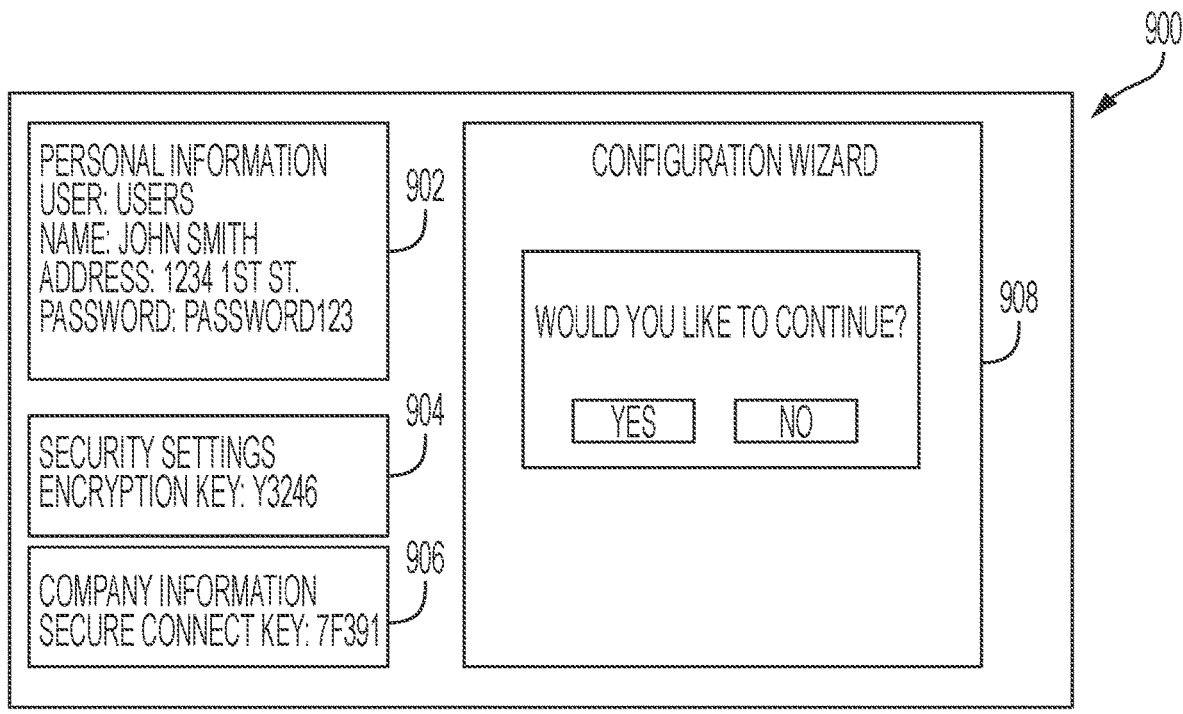
FIG. 9A is an illustration of an example unfiltered pre-boot user interface according to some embodiments of the disclosure.
Figure 9B:
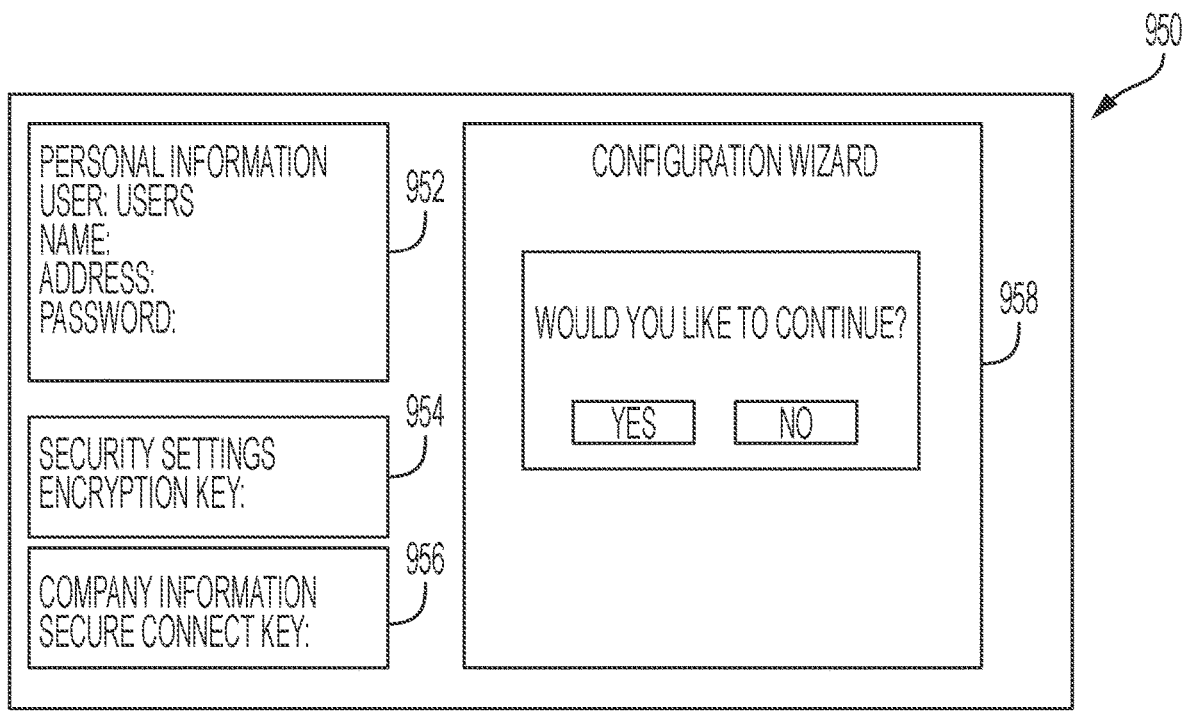
FIG. 9B is an illustration of an example filtered pre-boot user interface according to some embodiments of the disclosure.

An example unfiltered pre-boot user interface 900 is shown in FIG. 9A. The unfiltered pre-boot user interface may display a variety of private information such as personal information 902, security settings 904, and private company information 906. The unfiltered user interface may display non-private information as well such as a configuration wizard 908. User interface data may be filtered, as discussed above with respect to FIG. 8 to remove private information. The filtered user interface data may be transmitted to a remote client for generation and display of a filtered user interface on the remote client. An example filtered pre-boot user interface 950 generated based on filtered user interface data is shown in FIG. 9B. As shown in FIG. 9B, private personal information 952, security settings 954, and company information 956 have been filtered, while non-private information, such as configuration wizard 958, is displayed. Thus, user interface data may be filtered to remove private information before being transmitted to a remote client to protect private information.

The schematic flow chart diagram of FIGS. 6-8 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc include compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   entering a pre-boot stage by a first information handling system;
   displaying a pre-boot graphical user interface on a display of the first information handling system;
   connecting, during the pre-boot stage, the first information handling system to a remote client;
   filtering the pre-boot graphical user interface to remove information based, at least in part, on a privilege of the remote client; and transmitting, during the pre-boot stage, user interface data for the pre-boot graphical user interface from the first information handling system to the remote client for display of the user interface on a display of the remote client.

2. The method of claim 1, further comprising:
receiving, by the first information handling system, input data from the remote client;
updating the user interface based, at least in part, on the received input data; and
displaying the updated user interface on the display of the first information handling system.

3. The method of claim 1, wherein the step of connecting comprises:
connecting, during the pre-boot stage, the first information handling system to a second information handling system via a Bluetooth connection; and
transmitting an instruction, by the first information handling system, to the second information handling system to connect to the remote client.

4. The method of claim 3, wherein the step of transmitting user interface data comprises:
packaging user interface data in Bluetooth packets; and
transmitting the Bluetooth packets to the second information handling system.

5. The method of claim 1, wherein the user interface data comprises keyboard, video, and mouse (KVM) data.

6. The method of claim 1, wherein the user interface data comprises one or more extensible markup language (XML) elements.

7. The method of claim 1, wherein the step of filtering the pre-boot graphical user interface comprises filtering one or more extensible markup language (XML) elements defining user interface elements that contain private information that requires a privilege of the remote client before transmitting, during the pre-boot stage, the user interface data.

8. A system comprising:
a first information handling system; and
a remote client,
wherein the first information handling system comprises a processor configured to perform steps comprising:
entering a pre-boot stage;
displaying a pre-boot graphical user interface on a display of the first information handling system;
filtering the pre-boot graphical user interface to remove information based, at least in part, on a privilege of the remote client; and
transmitting, during the pre-boot stage, user interface data corresponding to the pre-boot graphical user interface from the first information handling system to the remote client, and
wherein the remote client comprises a processor configured to perform steps comprising:
receiving the user interface data from the first information handling system; and
displaying the pre-boot graphical user interface based, at least in part, on the received user interface data.

9. The system of claim 8, wherein the processor of the remote client is further configured to perform steps comprising transmitting input data to the first information handling system, and wherein the processor of the first information handling system is further configured to perform steps comprising receiving the input data from the remote client, updating the user interface based, at least in part, on the received input data, and displaying the updated user interface on the display of the first information handling system.

10. The system of claim 8, further comprising:
a second information handling system,
wherein the step of transmitting user interface data from the first information handling system to the remote client comprises transmitting user interface data to the second information handling system via a Bluetooth connection,
wherein the second information handling system comprises a processor configured to perform steps comprising:
receiving the user interface data from the first information handling system via the Bluetooth connection; and
transmitting the user interface data to the remote client.

11. The system of claim 10, wherein the processor of the second information handling system is further configured to perform steps comprising repackaging the received user interface data for transmission over a wireless network before transmitting the user interface data to the remote client.

12. The system of claim 8, wherein the user interface data comprises keyboard, video, and mouse (KVM) data.

13. The system of claim 8, wherein the user interface data comprises one or more extensible markup language (XML) elements.

14. The system of claim 13, wherein the processor of the remote client is further configured to perform steps comprising generating a user interface based, at least in part, on the one or more XML elements.

15. The system of claim 8, wherein the processor of the remote client is configured to filter the pre-boot graphical user interface by filtering one or more extensible markup language (XML) elements defining user interface elements that contain private information that requires a privilege of the remote client before transmitting, during the pre-boot stage, the user interface data.

16. An apparatus, comprising:
a first display; and
a processor coupled to the first display and configured to perform steps comprising:
entering a pre-boot stage;
displaying a pre-boot graphical user interface on the first display;
connecting, during the pre-boot stage, to a remote client;
filtering the pre-boot graphical user interface to remove information based, at least in part, on a privilege of the remote client; and
transmitting, during the pre-boot stage, user interface data corresponding to the pre-boot graphical user interface from a first information handling system to the remote client for display of the pre-boot graphical user interface on a display of the remote client.

17. The apparatus of claim 16, wherein the processor is further configured to perform steps comprising:
receiving input data from the remote client;
updating the pre-boot graphical user interface based, at least in part on the received input data; and
displaying the updated pre-boot graphical user interface on the first display.

18. The apparatus of claim 16, further comprising a Bluetooth module, and wherein the step of connecting further comprises:
connecting, during the pre-boot stage, to a mobile information handling system via a Bluetooth connection facilitated by the Bluetooth module; and transmitting an instruction to the mobile information handling system to connect to the remote client.

19. The apparatus of claim 18, wherein the step of transmitting user interface data comprises:
packaging the pre-boot graphical user interface data in Bluetooth packets; and
transmitting the Bluetooth packets to the mobile information handling system.

20. The apparatus of claim 18, wherein the processor is further configured to perform steps comprising filtering the user interface data before transmitting the user interface data to remove information based, at least in part, on a privilege of the remote client.

21. The apparatus of claim 16, wherein the processor is configured to filter the pre-boot graphical user interface by perform steps comprising filtering one or more extensible markup language (XML) elements defining user interface elements that contain private information that requires a privilege of the remote client before transmitting, during the pre-boot stage, the user interface data.

* * * * *